United States Patent Office 3,240,772
Patented Mar. 15, 1966

3,240,772
METHOD FOR STEREOSPECIFIC POLYMERIZATION OF ACRYLO MONOMERS IN THE PRESENCE OF A METAL AMIDE
Giulio Natta, Giorgio Mazzanti, Paolo Longi, and Francesco Bernardini, all of Milan, Italy, assignors to Montecatini, Società Generale per l'Industria Mineraria e Chimica, Milan, Italy, a corporation of Italy
No Drawing. Filed June 28, 1960, Ser. No. 39,219
Claims priority, application Italy, June 30, 1959, 11,191/59
18 Claims. (Cl. 260—88.7)

The present invention relates to a new process for the polymerization of acrylic and methacrylic monomers. More particularly, it relates to the use of a novel catalyst system for the polymerization of such monomers.

The preparation of crystalline polymers of $CH_2=CHR$ type hydrocarbons having a regular structure, these polymers obtained in the presence of catalysts from amine-type compounds of metals belonging to Group I, II, or III of the Periodic Table and transition metal compounds, wherein the metal is from Group IV, V or VI of the Periodic Table, has been described in the Italian Patent No. 601,433.

The amine-type compounds so described are generally of the type defined by the following formula:

$$Me[N(R_1R_2)]_m X_n$$

where Me is a metal such as lithium, beryllium, magnesium or aluminium; $R_1$ and $R_2$ are radicals either the same or different from one another, and may be alkyl, cycloalkyl, aryl, or a single alkyl-aryl group, or from together with the nitrogen atom a heterocyclic ring; X is chlorine, bromine or iodine; and $n$ is zero or a whole number, the sum of $n+m$ being equal to the Me valence, $m$ being not less than 1.

Typical transition metal compounds are titanium or vanadium halides having a lower valency than the maximum, or chromium halides and titanium alcoholates.

Specifically a process has been described based on the use of such catalysts to obtain regular-structured polymers of unsaturated aliphatic hydrocarbons with a terminal double bond. For example, the preparations of (1) highly crystalline ethylene polymers, (2) propylene polymers having a high isotactic macromolecules content, and (3) butadiene polymers having particular steric structures have all been described. The catalysts functions as initiators of stereospecific polymerization. This kind of polymerization had previously been carried out using catalysts containing metallo-organic compounds (i.e., having direct metal-carbon bonds). However, the above amine-type compounds cannot by themselves (i.e., in the absence of the transition metal compounds) effect the polymerization of unsaturated hydrocarbons.

Accordingly, it is an object of our invention to provide a method for polymerzing acrylic monomers wherein the polymerization can be carried out in the presence of a single catalyst.

Additional objects will become apparent hereinafter.

In accordance with one aspect of our invention, we have found that a particular class of amino-type compounds function as catalysts alone and by themselves for the stereospecific polymerization of acrylic monomers (such as, e.g., t-butyl acrylate, methyl methacrylate, methyl acrylate, isopropyl acrylate, etc.).

The catalyst of our invention is a compound represented by the following Formula A

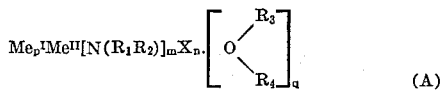

where $R_1$ and $R_2$ are organic radicals selected from the group consisting of alkyl, cycloalkyl, aryl, arylene, and aralkyl, $Me^I$ is an alkali metal, $Me^{II}$ is a metal selected from the group consisting of Groups I, II, and III of the Periodic Table, X is selected from the group consisting of hydrogen and the halogens, $R_3$ and $R_4$ are organic radicals selected from the group consisting of alkyl, aryl, and aralkyl, $p$ is an integer from zero to one, $m$ is a positive integer, $n$ is zero or a whole number, $m$ plus $n$ equals the sum of the valences of $Me^I$ and $Me^{II}$, and $q$ is an integer from zero to one.

It will be noted that when $p$ is zero, the compound will contain only one metal, i.e., $Me^{II}$. Similarly, when $q$ is zero, the compound will not be an etherate. When $n$ is zero then the compound does not contain an "X" group. Preferably, lithium is used for $Me^I$, and beryllium, magnesium or aluminium may be used for $Me^{II}$.

For example, etherates of aluminium lithium triamine monohydride can be used, in which the amine group $(NR_2)$ contains aromatic groups. For instance, the monoetherate of $LiAl[N(C_6H_5)_2]_3H$, that is, $$LiAl[N(C_6H_5)_2]_3H \cdot O(C_2H_5)_2,$$

is very active in the polymerization of acrylate monomers.

Despite the presence of an ether bonded to the catalyst, the polymerization is highly stereospecific. We have found that the presence of oxygen atoms in the monomer neither destroys nor reduces the catalytic activity of our catalyst compounds, in distinct contrast to what would happen if the metals of these catalysts were directly bonded to carbon instead of nitrogen.

Typical monomers which can be polymerized by the catalysts according to our invention include acrylic acid esters such as methyl acrylate, isopropyl acrylate or tertiary-butyl acrylate; methacrylic acid esters such as methyl methacrylate and isopropyl methacrylate; amides of acrylic and methacrylic acids; and nitriles such as acrylonitrile and methacrylonitrile.

The amine-type compounds comprised in our general Formula A can be obtained with a high degree of purity, by reacting a dialkyl-or diarylamine compound with a metal alkyl or mixed metal hydride.

With diarylamines the reaction may be carried out in boiling benzene. With dialkylamines, it is advisable to carry the reaction out at higher temperatures (e.g., from about 150 to 200° C.) and under pressure.

A detailed description of the preparation of some metal-amine compounds comprised by our general Formula A in accordance with the above method is given below.

*Example A.*—9 g. of $LiAlH_4$ (gas-volumetric purity 80%) are introduced under a nitrogen atmosphere into a 1-liter glass flask provided with a mechanical agitator, reflux-condenser and funnel with stopcock, and are suspended in 150 ml. of anhydrous ether. A solution of 170 g. of diphenylamine dissolved in 300 ml. of anhydrous ether are slowly dropped from the funnel with vigorous agitation so as to maintain a regular and not excessive development of hydrogen. The reaction mass is then heated up to the boiling point of the ether while agitating for 6 hours. The solid crystalline product formed is then decanted and after removing the bulk of the upper liquid ether, 3200 ml. of benzene are added and the reaction mass is heated until boiling in order to completely dissolve the solid product. The solution, after being filtered in a nitrogen atmosphere on a porous septum and left to stand for some hours, yields big colorless crystals of $$LiAl[N(C_6H_5)_2]_3H \cdot O(C_2H_5)_2$$

In order to increase the yield of crystalline product, the mother solution is evaporated under reduced pressure until a small volume is reached and then treated again with 100 ml. of anhydrous ether. Another large quantity of crystals is thus obtained having the same composition and purity as the previously obtained compound. The total yield is 84 g. of the above product, the analysis of which is as follows:

Al=4.28% (theoretical yield=4.395%)
Li=1.15% (theoretical=1.13%)
N=6.82% (theoretical=6.85%)
H(volumetric gas)=0.165% (theoretical=0.164%)

*Example B.*—The same type of reaction is carried out as in Example A, using the same quantity of LiAlH$_4$ but substituting 73 g. of diethylamine for the 170 g. of diphenylamine. After the reaction is complete, about two-thirds of the ether is removed and the solution is filtered on a porous septum. By cooling, small colorless crystals separate, having the following composition:

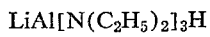
LiAl[N(C$_2$H$_5$)$_2$]$_3$H

The analysis is as follows:

Al=11.04% (theoretical=10.73%)
N=16.45% (theoretical=16.72%)
H$_2$(volumetric gas)=0.388 (theoretical=0.401%)

*Example C.*—By using an apparatus analogous to that described above, 32 g. of diphenylamine dissolved in 100 ml. of anhydrous benzene are slowly dropped in a solution containing 5.15 g. of diethyl beryllium in 50 ml. of benzene. The mixture is then heated until the benzene boils. A total of 3.3 N-liters of ethane are collected. (Calculated for a complete exchange reaction :3.44 N-liters are required.)

After boiling for two hours the mass is left to cool and a white precipitate is formed weighing 25 g. This is washed four times by decanting in a nitrogen medium with a total of 200 ml. of benzene. The product is:

Be[N(C$_6$H$_5$)$_2$]$_2$

Analytical results are as follows:

Be=2.59% (theoretical=2.61%)
N=8.14% (theoretical=8.11%)

*Example D.*—The preparation of alumium tris (dimethylamine) can be carried out as follows:

42.5 g. of Al (isobutyl) are introduced into a 1-liter autoclave in a nitrogen medium, dissolved in 70 ml. of n-heptane to which are added, with great caution, a solution of 60 g. of dimethylamine in 100 ml. of n-heptane. The autoclave is agitated and the temperature is rapidly raised to from 190 to 200° C. After 15 hours the heating is interrupted and the entire reaction product is poured from the cooled and downturned autoclave, under nitrogen medium into a 500 ml. glass flask. The excess amine and the bulk of the n-heptane are removed by distillation under reduced pressure, and the residue is then cooled down to 0° C. The big colorless crystals which separate have the following composition: di-(aluminium tris-dimethylamine): {Al[N(CH$_3$)$_2$]$_3$}$_2$, as shown by the following analytical data:

Al=16.58% (theoretical for Al [N(CH$_3$)$_2$]$_3$=16.94%)
N=26.15% (Theoretical=26.40%)
Cryoscopic molecular weight=320 (Theoretical for Al[N(CH$_3$)$_2$]$_3$=159.2).

*Example E.*—The preparation of Al[N(C$_6$H$_5$)$_2$]$_2$Cl can be carried out in the following way:

A solution of 23.2 g. Al(C$_2$H$_5$)$_2$Cl in 100 ml. anhydrous xylene is reacted, in an equipment described for the preparation of Be[N(C$_6$H$_5$)$_2$]$_2$, with a solution of 68 g. diphenylamine in 200 ml. anhydrous xylene. The gaseous ethane which during the reaction develops, amounts, at 20° C., to 4.3 litres. When the diphenylamine addition is completed, the resulting mixture is first boiled for about 2 hours and then, at the end of the gas development, cooled. The formed white powdery product, having the following composition:

Al[N(C$_6$H$_5$)$_2$]$_2$Cl is filtered under nitrogen, washed several times with anhydrous benzene and finally dried.

The analytical results are as follows:

Al:6.82% (theoretical=6.76%)
N:6.92% (theoretical=7.02%)
Cl:8.87% (theoretical=8.89%)

The polymers obtained with these catalysts from acrylic monomers show (from infra-red spectrography) a highly regular structure, absence of branchings along the polymeric chain, a head to tail linking between the monomeric units, and, in certain, cases, a noticeable crystallinity (as determined by X-ray examination). When these polymers are crystalline, their crystallinity is due to the presence of isotactic structure in the macromolecules. The stereospecificity of the catalysts of the present invention appears more evidently in the polymerization of acrylic acid esters of alcohols containing branched alkyl groups, e.g., such esters as isopropyl acrylate or t-butyl acrylate. In such cases the polymers present a high degree of crystallinity.

The polymerization can be carried out in the usual types of apparatus employed for low pressure polymerization. Preferably the polymerisation is carried out in the presence of an inert diluent and most suitably at a temperature within the range of from −100° to +100° C. When non-branched alkyl acrylates such as, e.g., ethyl acrylate are polymerized, the polymers obtained may be amorphous. However, this does not means a lack of stereospecificity which can be demonstrated by transforming a non-crystalline isotactic polyacrylate into a crystalline isotactic polyacrylate by transesterification with a branched alcohol, the resulting polyacrylate having a higher melting point and a higher tendency to crystallize.

Some of the polyacrylates thus obtained, as for instance the t-butyl polyacrylate, have a high crystallinity and a high melting point, higher than those of the polyacrylates prepared by other methods. This indicates a higher degree of regularity of structure, which results in many valuable uses. Highly crystalline acrylates can be melted and extruded into filaments which can be easily oriented, either by cold stretching or preferably at a temperature slightly above room temperature. Crystalline textile fibres are thus obtained presenting unusual luster. They can be easily linked by transesterification with polyfunctional alcohols. These textile fibres are readily dyed with dyes usually used in cellulose acetate dyeing. By partial saponification of the ester groups which are present in the fibres it is possible to render the fibres more hydrophilic and easily dyeable with basic dyes.

Although most crystalline synthetic fibres are not hydrophilic, crystalline methacrylate fibres can be rendered hydrophilic to the desired degree by means of a partial and controlled saponification of the fibres themselves. Moreover, a partial linkage with alcohols or polyvalent amines reduces the tendency of these fibres to swelling in solvents and prevents them from being attacked by certain detergents and surface active agents. Through a complete saponification of the highly crystalline polyacrylates, some highly crystalline polyacrylic acids and their derivatives can also be obtained. There is thus the possibility of obtaining new classes of isotactic compounds having a high crystallinity.

The following example will further illustrate our invention. All parts are by weight unless otherwise indicated.

*Example 1*

Into a 100 ml. flask provided with an agitator are introduced under nitrogen 0.05 g. of

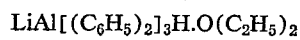
LiAl[(C$_6$H$_5$)$_2$]$_3$H.O(C$_2$H$_5$)$_2$ diluted in 20 ml. of toluene. The flask is cooled down to about −70° C. and a solution of 10 g. of t-butyl acrylate diluted in 30 ml. of toluene is slowly added (for one hour) with stirring. When this operation is completed the mixture is stirred for an additional two hours and then all of the polymerization product, which is a transparent gelatinous mass, is poured into boiling acetone containing a few milliliters of hydrochloric acid. After filtration and drying, 8 g. of a polymer in the form of white powder are obtained. It presents a crystallinity of about 60% as shown by X-ray tests. The spectrum carried out on an oriented fibre shows an identity period, along the polymeric chains, of 6.5 Angstroms, corresponding to an isotactic structure of the macromolecules. The intrinsic viscosity, determined in chloroform at 30° C., is 6.1.

*Example 2*

Proceeding as described in Example 1, but maintaining the temperature at 20° C. and using 0.04 of $$LiAl[N(C_2H_5)_2]_3$$

H suspended in 20 ml. of toluene, 9.6 g. of polymer are obtained from 12 g. of t-butyl acrylate. The X-ray test of the obtained polymer carried out with the powder method, showed that the polymer is crystalline. About 86% of the total polymer is insoluble in boiling acetone and shows (X-ray test) a crystallinity of about 70%. The melting point of the polymer is about 160° C., as determined with a polarizing microscope. The polymer is insoluble in boiling acetone.

*Example 3*

Proceeding as indicated in Example 2, but using as the polymerization catalyst 0.05 g. of $Al[N(CH_3)_2]_3$, 4 g. of polymer partially soluble in boiling acetone are obtained.

*Example 4*

The polymerization of 10 g. of t-butyl acrylate is carried out at −10° C. in the presence of 0.05 g. of N-carbazyl lithium ($LiNC_{12}H_8$) suspended in 40 ml of toluene. Polymerization is very rapid and practically quantitative. The polymer obtained contains less than 10% of products extractible with boiling acetone.

*Example 5*

Proceeding as described in Example 1, but using, as monomer, isopropyl acrylate instead of t-butyl acrylate, 9 g. of solid white polymer are obtained showing (by X-ray test) a high crystallinity. The diffraction spectrum of a stretched fibre shows (by the X-ray test) that the crystalline product consists of macromolecules having an isotactic structure, with an identity period along the chain of 6.5 Angstroms and a spiral having a ternary symmetry. The intrinsic viscosity, determined in chloroform at 30° C., is equal to 1.4.

*Example 6*

Proceeding as described in Example 5 and using as the catalyst for the isopropyl acrylate polymerization 0.02 g. of carbazyl lithium ($LiNC_{12}H_8$), 8 g. of a white flock polymer are obtained from 10 g. of monomer in 6 hours, the polymerization being carried out at −45° C. A sample of this polymer, maintained for 2 hours at 135° C. under nitrogen and then slowly cooled, shows (by the X-ray test) a high crystallinity and a structure equal to that of the polymer obtained in the previous example. The intrinsic viscosity, determined in chloroform at 30° C., is equal to 7.2.

*Example 7*

Using the equipment described in Example 1, but employing a catalyst of 0.1 g. of carbazyl lithium ($LiNC_{12}H_8$) diluted in 20 ml. of toluene, 20 g. of methyl methacrylate diluted with 20 ml. of anhydrous toluene are polymerized.

By operating as usual, after 4 hours a solid flocky polymer is isolated by precipitation with methanol. After several washings with methanol and drying, the polymer obtained amounts to 18.5 g. A sample of this product, first melted and then cooled very slowly, presents an infrared spectrum different from that of the molten polymer and different from those of the polymers normally produced with radical type initiators. More precisely, in the infrared spectrum of the polymer obtained according to this example, the absorption bands which were already noted by R. C. Miller et al. (Chemistry in Industry 1958, 1323) at 955 and 755 cm.$^{-1}$ (with no bands at 1063, 965, 913, 825 and 747 cm.$^{-1}$) and attributed by these authors to a regular structure of the macromolecules, are clearly seen.

*Example 8*

Proceeding as described in Example 5, but using 0.05 g. of $LiAl[N(C_6H_5)_2]H.O.(C_2H_5)_2$, 10 g. of polymer are obtained in the form of very compact and transparent lumps, starting with 20 g methyl methacrylate.

*Example 9*

Using the procedure of Example 8, 20 g. of methyl methacrylate is polymerized at room temperature using as the catalyst 0.15 g. of $Al[N(C_6H_5)_2]_3$. 17 g. of polymer are obtained.

*Example 10*

Using the catalyst of Example 8, 17 g. solid, powdery polyacrylonitrile, having an intrinsic viscosity of about 0.3, determined in dimethyl-formamide at 30° C., are obtained starting from 20 g. monomer.

Variations can, of course, be made without departing from the spirit of our invention.

Having thus described out invention, what we desire to secure and claim by Letters Patent is:

1. A method of polymerizing acrylic and methacrylic monomers selected from the group consisting of acrylic acid esters, methacrylic acid esters, amides of acrylic and methacrylic acids, and nitriles of acrylic and methacrylic acids which comprises polymerizing said monomers at a temperature ranging from about −100° C. to a +100° C. and in the presence of an effective amount of a catalyst consisting of a compound of the formula

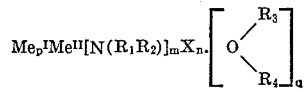

wherein $R_1$ and $R_2$ are organic radicals selected from the group consisting of alkyl, aryl, aralkyl, and when taken together with the nitrogen atom form a heterocyclic ring; $Me^I$ is an alkali metal; $Me^{II}$ is a metal selected from Groups I, II and III of Mendeleeff's Periodic Table and is bound directly to the nitrogen atom by non-coordinate bonds; X is selected from the group consisting of hydrogen and the halogens; $R_3$ and $R_4$ are alkyl radicals; p is an integer from zero to one; m is a positive integer; n is selected from the group consisting of zero and a whole number; m plus n equals the sum of the valences of $Me^I$ and $Me^{II}$, and q is selected from the group consisting of zero and one.

2. The method of claim 1 further characterized in that $Me^I$ is lithium and X is hydrogen.

3. The method of claim 1 further characterized in that $Me^{II}$ is a metal selected from Group II of the Periodic Table.

4. The method of claim 1 further characterized in that the catalyst is $$LiAl[N(C_6H_5)_2]3H.O(C_2H_5)_2$$

5. The method of claim 1 further characterized in that the catalyst is $$Be[N(C_6H_5)_2]_2$$

6. The method of claim 1 further characterized in that the catalyst is $$[Al[(CH_3)_2]_3]_2$$

7. The method of claim 1 further characterized in that the catalyst is lithium carbazyl having the formula

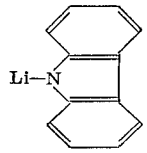

8. The method of claim 1 further characterized in that the catalyst is $$Al[N(C_6H_5)_2]_3$$

9. The method of claim 1 further characterized in that the catalyst is $$LiAl[N(C_2H_5)_2]_3H$$

10. The method of claim 1 further characterized in that the catalyst is $$Al[N(C_6H_5)_2]_2Cl$$

11. The method of claim 1 further characterized in that the monomer is an alkyl acrylate wherein the alkyl group has 1 to 6 carbon atoms.

12. The method of claim 1 further characterized in that the monomer is an alkyl methacrylate wherein the alkyl group has from 1 to 6 carbon atoms.

13. The method of claim 11 further characterized in that the alkyl group is a branched alkyl radical having from 3 to 6 carbon atoms.

14. The method of claim 13 further characterized in that the branched alkyl radical is isopropyl.

15. The method of claim 13 further characterized in that the branched alkyl radical is tertiary butyl.

16. The method of claim 12 further characterized in that the alkyl methacrylate is methyl methacrylate.

17. The method of claim 1 further characterized in that the monomer is acrylonitrile.

18. The method of claim 1 further characterized in that $Me^{II}$ is aluminum.

References Cited by the Examiner
UNITED STATES PATENTS

| | | | |
|---|---|---|---|
| 2,412,034 | 12/1946 | D'Alelio | 260—85.5 |
| 2,905,645 | 9/1959 | Anderson et al. | 260—94.9 |
| 2,910,461 | 10/1959 | Nowlin et al. | 260—94.9 |
| 2,956,990 | 10/1960 | Fettes | 260—89.5 |
| 2,973,337 | 2/1961 | Stroh et al. | 260—80 |
| 3,088,939 | 5/1963 | Miller | 260—89.5 |
| 3,103,503 | 9/1963 | Fox et al. | 260—89.5 |

FOREIGN PATENTS 566,713  4/1958  Belgium.

OTHER REFERENCES

Fox et al., J.A.C.S., vol. 80 (1958), pages 1768–9.
Miller et al., J.A.C.S., vol. 80 (1958), pages 4115–6.
Garrett et al., J.A.C.S., 81, Feb. 20, 1959, pages 1007–8.
Miller et al., J. Polymer Sci., vol. 55, pages 643–656 (1961).

JOSEPH L. SCHOFER, *Primary Examiner.*

MILTON STEARMAN, LOUISE P. QUAST, JOSEPH R. LIBERMAN, LEON J. BERCOVITZ, DONALD E. CZAJA, *Examiners.*